SKEW CORRECTION APPARATUS UTILIZING A TORSIONALLY DEFORMABLE CAPSTAN

Filed June 24, 1965

INVENTOR.
DEAN L. DE MOSS

By Smyth, Roston & Pavitt
ATTORNEYS.

3,387,295
SKEW CORRECTION APPARATUS UTILIZING A TORSIONALLY DEFORMABLE CAPSTAN

Dean L. De Moss, Camarillo, Calif., assignor to Minnesota Mining and Manufacturing Company, St. Paul, Minn., a corporation of Delaware Filed June 24, 1965, Ser. No. 466,607
16 Claims. (Cl. 340—174.1)

ABSTRACT OF THE DISCLOSURE

A tape transport with skew correction is disclosed in which a torsionally deformable capstan is controlled from signals representing tape skew. The resulting deformation of the capstan corrects the tape skew. The capstan is particularly driven by two printed circuit motors, whereby temporary speed differences of the motors twist the capstan.

Figure 1:
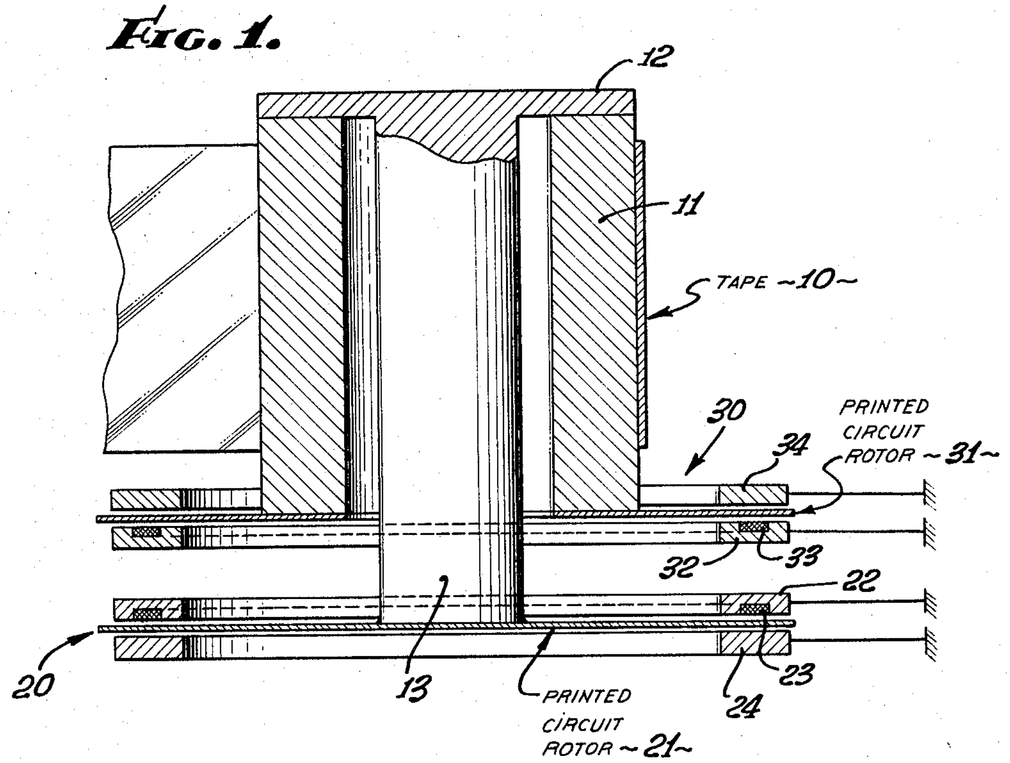

The present invention relates to a deskewing system. One of the problems of multi-track tape recording and reproducing results from the phenomenon often described as "skew," or as inter-channel time displacement error, ITDE. These errors have several quite different sources but they produce overlapping effect and very often are thus not distinguishable from each other.

Skew or ITDE includes dynamic and static skew. The static skew can be explained as follows. Assumed it may be that a relatively broad magnetic tape is to be used for multiple track recording, whereby particularly concurrent recordings are to be made on several tracks. As an example, in digital data processing digital numbers may be required to be recorded in a 7 bit character format with the bits of a character to be recorded concurrently. Thus, in this case one needs 7 recording tracks, whereby the 7 bits of a character are recorded concurrently across the tape.

The bits of a character are furnished for purposes of recording in strict concurrent relationship as far as time is concerned. The bits of a character when retrieved later on from the tape for processing are also to be processed strictly concurrently. Thus, it is necessary that the 7 bits of a character are indeed recorded on the tape in transverse alignment, and that they are read from the tape concurrently indeed.

However, the transducer assemblies which perform recording and reproducing are subjected to several errors. One error source is that the seven recording gaps in the transducers are not completely aligned (gap scatter). Additionally, the mounting of the transducer head, on one hand, and the tape guiding and transporting system, on the other hand, will not necessarily produce a tape movement in which the direction of tape movement is precisely 90° to the direction of extension of the supposedly aligned record transducer head assemblies. These two effects produce the static skew.

Static skew occurs during recording as well as during reproducing because recording and reproducing transducers are individually subjected to these errors. The effect of the static skew is that concurrently recorded bits of a character will be reproduced sequentially. It is extremely unlikely that the static skew as it resulted during recording is offset by the static skew of the reading transducer.

The above-described phenomenon of static skew has superimposed the so-called dynamic skew, which results from a temporarily irregular and possible oscillator, i.e., rotary tape movement about an axis in a plane defined by the tape as it passes across recording or reproducing transducer heads. The dynamic skew is noticeable in that the phenomenon described above as static skew will change in time.

It is apparent that the effects of static skew can be offset electrically, if known, by individually delaying the recording of the bits for each track, and by also delaying transfer of reproduced bits in each transducer channel. Thus, data bits provided concurrently for recording are not recorded concurrently anymore so as to offset the static skew of the recording transducer, and the bits will then be aligned across the tape. During readout a selective delay in each reproducer channel permits character assembly at fixed instants. It is apparent, however, that this method of correction will fail to offset the effect of the dynamic skew in view of the fact that the dynamic skew is a phenomenon which changes in time unless the selective delay is made variable which renders the delaying circuit network extremely complicated.

The invention now is concerned with a system which permits elimination or at least a substantial reduction of static and dynamic skew. The invention finds application for individually deskewing recording and reproducing units.

Usually, a capstan is used for driving a magnetic tape. A capstan is a cylindrical roller frictionally engaging the tape for purposes of transporting same. It is now suggested to subject the capstan, in addition to the normal drive motion, to a twisting torque which may change in time thereby causing upper and lower edges of the tape to be shifted relative to each other to an extent necessary to offset the skew. The invention, furthermore, includes means to detect the skew by monitoring the instantaneous advance of upper and lower edges of the tape, and the outputs of these detectors are used to control the twisting motion of the capstan.

It should be mentioned that utilization of the terms "upper" and "lower" edges of the tape, and "end" of the capstan serve only the purpose of convenience and are to be understood only in relationship to the specific illustration of the figures. It is, of course, understood that many tape systems operate in a manner in which the plane of rotation is oriented vertically so that the axis of rotation of the capstan is correspondingly horizontal. In this case, one will have to say "left" or "right" hand tape edge, or one could use as a designation inner and outer edges in relation to the tape supporting plate. It is understood that these orientations have no bearing on the particulars of the invention. This is particularly so, as gravity does not play any part in the basic features of the invention. However, it is conceivable that gravity might have to be considered for purposes of initial adjustment. For example, in case of a horizontal drive, there would be a cantilever effect on the capstan that may be noticeable and affects bias adjustments.

The invention specifically concerns magnetic tape recording and reproducing, however, it is understood that other types of recording tape, like film, punch tape, etc., may exhibit similar problems and the problem of skew can be offset in the same manner. The invention is further concerned with tape drive mechanisms for driving broad tape regardless of the content that is recorded, digital or analog information or both.

Figure 2:
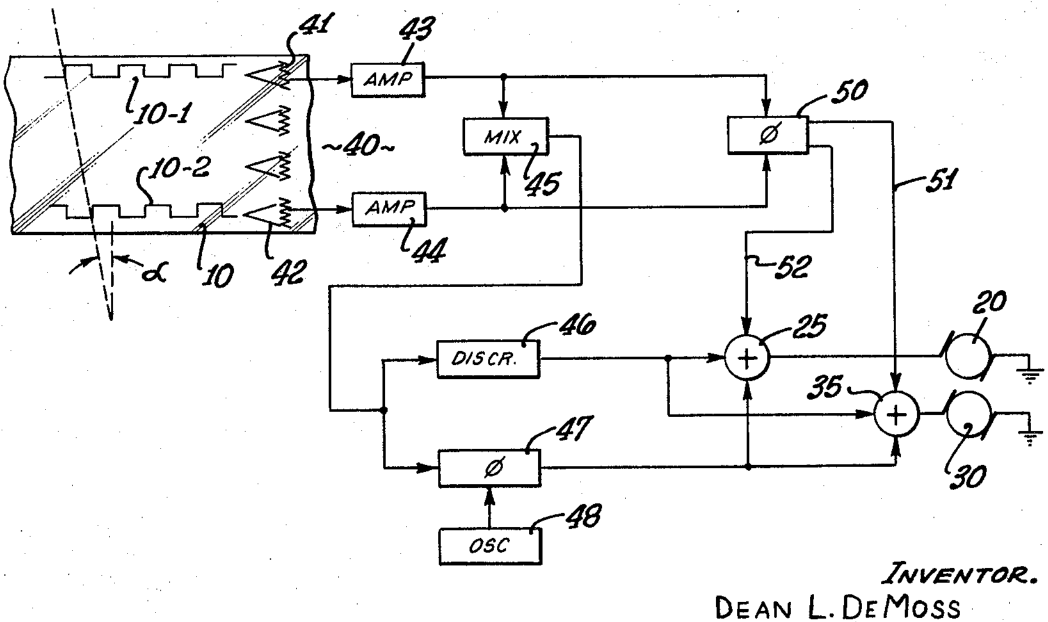

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIGURE 1 illustrates a cross-sectional view through a capstan drive system in accordance with the preferred embodiment of the present invention; and FIGURE 2 illustrates a block diagram of a control circuit system for controlling the capstan drive shown in FIGURE 1, and in a manner which permits deskewing of a magnetic tape.

Proceeding now to the detailed description of the drawings;

In FIGURE 1 thereof is shown the physical layout of a capstan tape drive system incorporating the features of the invention. A tape 10 is at least partially wrapped around, or otherwise urged, against a capstan which is comprised of a tubular, hollow body 11. The tape 10 specifically engages frictionally the outer mantle surface of this tubular body 11. Capstan tube 11 is closed on one side by means of a top plate 12 which may be integral therewith or separately attached to body 11.

A drive shaft 13 projects into the interior space of the tubular capstan body 11 and is attached centrally to the plate or disk 12. Care should be taken that the outer cylindrical mantle of capstan body 11 and the shaft 13 are positioned very accurately in coaxial relationship in order to prevent the introduction of a wobbling motion upon tape 10 during rotation of the capstan.

The end of shaft 13 which projects out of the interior, hollow space of capstan tube 11 bears a printed circuit rotor 21 of an electric motor 20. The printed circuit motor 20 cooperates with a stator assembly comprised of a stator magnet 22 having an energizing coil 23 and a ring-shaped return magnet 24. During operation, the printed circuit motor 20 thus established drives the shaft 13, thereby causing disk 12 and capstan 11 to follow this rotation. Thus, motor 20 transmits torque upon the upper end of tube 11. A printed circuit motor is employed here as the preferred driving means because the control operation contemplated requires low inertia characteristics.

The open side (lower end) of the capstan 11 is attached to a printed circuit rotor 31 of a second motor 30 to receive torque separately from the torque transmission by motor 20. This rotor 31 is ring-shaped thus having a central aperture through which the shaft 13 projects. The rotor 31 is attached to capstan tube 11 in such a manner that a strictly coaxial rotary system is established which includes the tube 11, shaft 13, rotor 21 and rotor 31. There is provided a corresponding stator assembly comprised of a stator magnet 32 with energizing coil 33 and ring-shaped return path magnet 34.

It is thus established that the motor 20 imparts a rotary motion upon the capstan tube 11 which is effective in the upper part of the tube 11 as far as torque transmission is concerned. The upper edge of the magnetic recording tape 10 is guided in and along the vicinity of this area of effective torque transmission by motor 21. The motor 30 imparts a rotary motion upon the lower portion of the capstan tube 11, and the lower edge of the tape 10 is guided in and along the vicinity of this second torque transmission.

Assuming that the rotors 21 and 31 rotate in precise speed and phase synchronism, then the torque imparted upon upper and lower portions of capstan tube 11 is equal, and the tape 10 including the upper and lower edges thereof receive equal motion. This is the operating condition if there is no skew. If during opertion any skew or ITDE is detected in that at any instant any given reference point on the lower edge of the tape appears to have moved somewhat ahead or somewhat behind the transversely positioned reference point of the upper edge of the tape, such skew can be offset by imparting a torsion upon the capstan tube 11 which tends to shift upper and/or lower edges of the tape relative to each other to offset such skew. This, of course, is possible because the tape is in frictional engagement with the circumference of the capstan.

The skew compensating torsion is produced by imparting temporarily and/or maintaining temporarily different torques as provided by the two rotors so that for a particular period of time the torques imparted on the upper and lower portion of the capstan tube differ. The torque difference will produce torsion in the tube 11. In order to permit such torsion to be effective it is necessary to make the capstan tube 11 out of a resilient or compliant material so that the amount of power necessary to twist the capstan tube is not excessive.

The circuit network shown in FIGURE 2 is an example for a control circuit for the two motors 20 and 30, for purposes of deskewing the tape in a manner outlined above. For this, we first return specifically to the tape 10, also shown symbolically in FIGURE 2. This tape 10 has a central data track bearing portion, an upper sync track 10–1, and a lower sync track 10–2. Specifically, upper and lower sync tracks are composed of signals record respectively close to upper and lower edges of the tape. Preferably (but not necessarily) the upper and lower sync tracks each are comprised of regularly spaced magnetic transitions producer, i.e., recorded concurrently, i.e., in supposed correct alignment across the tape. Skew becomes effective in a displacement of upper and lower sync tracks as recorded and/or as reproducibly presented in the individual reproducing channels. Physically this can be identified by a skew angle $\alpha$.

The tape presumably has several data tracks, for example, 7 data tracks, each provided for purposes of recording digital data in a 7 bit character format. When recorded without skew, then the bits of a character are aligned in a direction transversely to the extension and movement of the tape. The transitions in the sync tracks may be considered as extensions of such characters to appear in alignment with the data or information bits of a character. One can say that the data bits of each character are recorded on the tape together with two synchronization bits. The sync tracks may additionally be used for purposes of bit or character detection and assembly (tape or character clock) in order to signal the appearance of a character under the reader transducer assembly 40.

The two tracks 10–1 and 10–2 are respectively scanned by the very accurately aligned transducers 41 and 42. These transducers may, in general, be components of the read transducer 40, flanking the data reading transducers. The alignment of all transducers across the tape may, however, be subjected to an alignment error due to the static skew. For the moment it will be assumed that the two pickup transducers 41 and 42 are supposedly aligned in such a manner that the transitions of the sync tracks 10–1 and 10–2 are detected concurrently: there is no skew.

The output signals of the transducers 41 and 42 may be subject to amplification or other suitable signal modifications performed by networks having general circuit characteristics 43 and 44. The outputs of the networks 43 and 44 will be sine waves of suitable and equal amplitudes. These two sine waves, of course, have equal frequencies, and they are in phase in case there is no skew. In case there is dynamic or static skew, then the signal output of network 43 will have a phase relationship leading or lagging with relation to the signal output of the network 44.

In order to provide for a tape speed control, the two signals from networks 43 and 44 are both fed to a mixer 45. In case there is no skew whatever, not only the frequency but also the phase of the output of mixer 45 will be equal respectively to the frequency and phase of the individual signals fed into it. In case there is a skew, then the frequency of the output of mixer 45 still will be the same, but the phase will be in between the phase of the individual sinusoidal signals of networks 43 and 44, which means that the phase of the output signal of mixer 45 is representative of the phase position of the center of the tape. As this is the general case, with or without skew, the output of mixer 45 is thus an accurate reproduction of speed and phase of the center of tape 10 as it moves past the transducers.

The output of mixer 45 is now used in a conventional manner to provide for a speed control signal. Briefly, the output of mixer 45 is fed into a frequency discriminator 46 to provide for a basic or coarse speed control signal. Additionally, the output signal of mixer 45 is passed to a phase detector 47, receiving a reference signal from an oscillator 48 (directly or via a frequency converter). The frequency of the reference signal furnished by oscillator 48 is very accurately kept constant, and it is, of course, the frequency to which the discriminator 46 is attuned.

The tape 10 is controlled toward a speed in which the averaged passage of the transitions of the tracks 10–1 and 10–2 have phase and frequency equal to that of the reference oscillator 48. Phase detector 47 and frequency discriminator 46 feed their respective output signals to summing points 25 and 35 as uniform and similar control signals for the two motors 20 and 30. There may be interposed adapter circuits to offset differences in the driving characteristics of the two motors.

Disregarding for the moment the other signals which are used for controlling the two motors, it can be seen that with the circuit configurations as described so far, the two motors are controlled toward a constant speed, including a position control for the center of the tape to maintain a proper phase relationship to the signal furnished by standard or reference oscillator 48. The deskewing control now operates as follows:

The two output signals of the networks 43 and 44 are additionally passed to a phase detector 50. Phase detector 50 has two output channels 51 and 52 providing signals of equal amplitude but opposite sign. The output signal in channel 51 of the phase detector 50 will, for example, have positive polarity in case the upper edge of the tape leads, and concurrently the signal in output channel 52 will have negative polarity. In case the upper edge of the tape lags in relation to the lower edge thereof, the polarity relation is reversed.

Channel 51 terminates in summing point 35 and channel 52 terminates in summing point 25. In case the output signal in channel 51 is positive, an additional driving component is passed to motor 30 for increasing the torque furnished by motor 30 to the lower end of capstan tube 11. The corresponding negative signal in channel 52 is subtracted from the resulting signal in summing point 25 to correspondingly reduce the input signal for the motor 20. Thus, the torque derivable from motor 20 is temporarily reduced.

As a result of this operation, the average torque and thus speed with which the two motors 20 and 30 drive the capstan 11 will still be the same. In other words, position control of the center of tape 10 is not affected by the control signals from phase detector 50. However, the difference in the individual torques imparted upon the top and bottom of capstan tube 11 tends to eliminate the skew, because the torque difference causes a twisting of the capstan to effectively advance the position of the lower edges of tape 10 relative to the center thereof, while the lower edge is retarded. Hence, the tape is in effect tilted. When the skew has the opposite phase, the polarities of the resulting output signals in channels 51 and 52, is reversed and the motor 30 will then be retarded, motor 20 accelerated. This effectively eliminates the skew in any case.

The transducers 41 and 42, as part of the read or reproduce transducer assembly 40 which monitors the several tracks on tape 10, will, of course, exhibit static skew.

Such static skew or ITDE will thus result in a fixed phase deviation between the signals as picked up by transducers 41 and 42 at normal or proper operating conditions. This fixed phase shift establishes an operation condition which causes a permanent twisting of the capstan to consequently offset the static skew of the transducers. The dynamic skew appears as a variable phase shift of the two signals as picked up by the two transducers 41 and 42. Experience has shown that the low inertia motors driving the capstan have a response considerably faster than the rate of change of the skew, i.e., of the phase angle between the two signals.

Upon to this point, it has been assumed that the tape was recorded without skew. This, however, may not be true as the tape read with a machine here contemplated, may have been recorded with a rather poor recorder having both dynamic and static skew. Thus, the recording on tape 10 may not be free from skew, i.e., the data on the tape are in fact not traversely aligned which, of course, includes the sync transitions of the two tracks 10–1 and 10–2. Here, the ultimate objective must be considered. The main point is to read data free from skew so that bits intended for concurrent storage on the tape can be reproduced concurrently. The inventive control system implicitely takes care of the problem inherent in a poorly recorded tape as far as skew is concerned. The detecting system actually responds to a skew in the recording sequence as it passes the reproducing transducer system. Only in case the recording is a perfect one the skew of the data is that of the tape during reproducing. The control system actually does not deskew the tape but the recording, i.e., it causes the capstan to be twisted so that the data on the tape appear in perfect alignment even if as a result thereof the tape is actually subjected to skew because it holds data that were recorded with skew.

The control system shown in FIGURE 2 operates in a manner which lends to the suggestion that it is usable also in the record mode. Additionally, the following remarks are necessary here. As long as the tape is being used with the same unit, it is basically not too important how irregular data are recorded on the tape in such a multiple track recording system as long as it is possible during the reproduce mode to eliminate the composite skew effect (ITDE) resulting from static and/or dynamic skew during recording and reproducing. It is thus not too important how irregular the data are in effect being recorded. On the other hand, it should be noted that it is very desirable that tapes can be exchanged from unit to unit. For this reuse, tapes should be recorded in a very accurate manner.

The system shown in FIGURE 2 can be made effective also during the record mode. Here it has to be considered that the read and record transducers are usually very closely spaced. Additionally, the reproduce head is usually placed behind the record head assembly, considering the normal direction of tape movement. Furthermore, and this is particularly true in case of data processing, very often a so-called read-after-write check is conducted in that data which have just been recorded are read out again immediately for purposes of checking on the correctness of the recording made. If now the sync tracks 10–1 and 10–7 are recorded at the same time the data are recorded, as will be the case normally, then the readout of the sync tracks in the read-after-write check can be used immediately to control the capstan during recording in order to prevent skew from becoming effective.

The system is, of course, subject to modifications in that the two motors may, for example, be driven normally from just one sync track, for example, the lower sync track 10–2. The mixer 45 could then be eliminated and the output of, for example, network 44 can be used directly to serve as one input for discriminator 46 and phase detector 47. Additionally or alternatively, a single output of phase detector 50 may be used to influence positively or negatively only one of the two motors. In this case one motor is driven always at approximately constant speed, with the tape movement being controlled in such a manner that, for example, the lower edge is always in strict phase synchronism with the oscillator output, while only the other motor 21 driving the tape, so as to speak, is used to impart additional motion upon the upper edge to offset skew.

Another conceivable modification of the principal system may include the regular control circuits for both motors, while one or the other thereof is dynamically or otherwise braked for selective retardation of upper or lower tape edge.

A brief remark should be made concerning the problem of stability. The capstan 11 must be made of a resilient body for introduction of twisting or torsion. As this torsion is only temporary in nature during control of dynamic skew such temporary torsion will necessarily serve as a source for torsion oscillations. However, it has been found that a capstan of the usual dimensions, being hollow and made of hard rubber, such as is used for driving a conventional tape, will exhibit such high torsional mode resonant frequencies which are well above, by one or even by several orders of magnitude, the frequencies of the dynamic skew. Hence, the sources of induced frequencies, which are the dynamic skew and the feedback control system counteracting the dynamic skew, operate at frequencies which are insufficient to stimulate any kind of resonance in the capstan body 11.

I claim:

1. In a tape recording-reproducing system,
a capstan for advancing a recording tape in frictional engagement therewith, said capstan having upper and lower end portions respectively in the vicinity of the upper and lower edges of the recording tape;
driving means for transmitting individual driving torques to the upper and lower end portions of said capstan for causing said capstan to rotate and to advance the tape;
skew detecting means operatively coupled to the tape when advanced by said capstan to provide signals indicative of the instant skew; and
means for controlling said driving means in response to said signals for imparting different torques upon said end portions of said capstan so as to twist said capstan to substantially offset the skew as represented by said signals.

2. A tape transport system, comprising:
a capstan constructed to permit torsional deformation and having a surface permitting frictional engagement with a tape for advancing the tape;
means for individually monitoring the progression of the two edges of the tape;
driving means connected to said capstan for causing rotation and torsional deformation of said capstan; and
signal means for controlling said driving means to torsionally deform said capstan in response to the signals provided by said monitoring means.

3. A tape transport system, comprising:
a capstan constructed to permit torsional deformation and having a surface permitting frictional engagement with a tape for advancing the tape;
means for detecting skew of said tape, and providing signals indicative thereof; and
signal means for controlling driving means to torsionally deform said capstan in response to the signals provided by said detecting means to substantially eliminate said skew.

4. In a tape transport system,
a capstan made of yieldable material permitting torsional deformation; and
means for imparting individual torques upon the ends of the capstan.

5. A tape transport system, comprising:
a capstan made of yieldable material permitting torsional deformation and frictional engagement with a tape;
two low-inertia motors for individually driving the ends of the capstan; and
circuit means for individually controlling said two motors.

6. In a tape transport system,
a tubular capstan having two ends and being made of yieldable material permitting torsional deformation;
a shaft coaxially projecting through said capstan and being anchored to one of said ends;

first means for driving said shaft; and
second means for driving the other one of said ends.

7. A tape transport system, comprising:
a twistable capstan having two ends;
means for individually driving the capstan ends;
means for controlling said driving means for uniformity of speed; and
means for temporarily causing said driving means to impart different torques upon said capstan for torsionally deforming said capstan.

8. In a tape transport system,
means for monitoring individually the progression of the two edges of a tape, and providing sinusoidal signals respectively representative thereof;
means for detecting the phase relation of said two signals and providing a control signal representative thereof;
a torsionally deformable capstan for driving the tape; and
means for twisting said capstan in response to said control signal.

9. In a tape transport system,
a capstan made of yieldable material permitting torsional deformation and frictional engagement with a tape;
two low-inertia motors for individually driving the ends of the capstan, and providing individual output signals thereof;
signal means responsive to a phase difference of said two output signals for controlling the two motors toward differing speeds; and
signal means responsive to the phase and frequency of at last one of said output signals to control said two motors in unison.

10. In a tape recording-reproducing system,
a cylindrical, hollow capstan for advancing a recording tape, said capstan being closed on one end;
a driving shaft projecting into said hollow capstan and being affixed centrally to the closed end thereof;
first and second motor means, each having a rotor, the rotor of said first motor means being drivingly connected to said shaft, the rotor of said second motor means being drivingly connected to the open end of said capstan;
circuit means for controlling said first and second motor means normally to run at equal speeds;
skew detecting means for driving signals representative of the tape skew when advanced by said capstan; and
circuit means for controlling at least one of said motors in response to said signals for causing said one motor to deviate from the speed of the other motor thereby imparting a twisting distortion upon said capstan.

11. In a tape transport system, the tape to be transported having reference signals recorded along its two opposite edges and in predetermined phase relationship, the combination comprising:
means for detecting the phase relation of said two signals and providing a control signal representative thereof;
a torsionally deformable capstan for driving the tape; and
means for twisting said capstan in response to said control signal.

12. In a tape transport system,
a capstan made of yieldable material permitting torsional deformation;
means for imparting individual torques upon the ends of the capstan; and
means for controlling the imparting in response to signals representative of the desired relative direction to be imparted by the capstan upon a tape when engaging the capstan.

13. A tape transport system, comprising:
a capstan made of yieldable material permitting torsional deformation and frictional engagement with a tape;

two low-inertia motors for individually driving the ends of the capstan; and circuit means for individually controlling said two motors to obtain a particular direction of transport of the tape.

14. A tape transport system comprising:

a capstan made of yieldable material permitting torsional deformation and frictional engagement with a tape;

means for determining skew of the tape and providing signals in response thereto;

means for individually driving the ends of the capstan; and circuit means coupled to the means for driving and being responsive to the signals for controlling the means for driving for reducing the skew.

15. In a system as set forth in claim 14, the means for driving being two low-inertia motors respectively coupled to the two ends of the capstan.

16. In a tape transport system, a tubular capstan having two ends and being made of yieldable material permitting torsional deformation;

a shaft coaxially projecting through said capstan and being anchored to one of said ends;

first means for driving said shaft;

second means for driving the other one of said ends;

means for providing signals representative of skew of a tape as driven by the capstan; and means connected to be responsive to the signals and controlling the first and second means for at least substantially eliminating the skew.

References Cited

UNITED STATES PATENTS

| | | | |
|---|---|---|---|
| 2,989,265 | 6/1961 | Selsted | 226—18 |
| 2,937,239 | 5/1960 | Garber et al. | 340—174.1 |

BERNARD KONICK, *Primary Examiner.*

A. I. NEUSTADT, *Assistant Examiner.*